United States Patent
Kuhn et al.

(10) Patent No.: US 12,334,989 B2
(45) Date of Patent: Jun. 17, 2025

(54) RADIO FREQUENCY TESTING APPARATUS WITH VOLTAGE STANDING WAVE RATIO ADJUSTMENT AND CORRESPONDING METHOD

(71) Applicant: Rohde & Schwarz GmbH & Co. KG, Munich (DE)

(72) Inventors: Christian Kuhn, Munich (DE); Alexander Roth, Dorfen (DE); Florian Ramian, Karlsfeld (DE)

(73) Assignee: Rohde & Schwarz GmbH & Co. KG, Munich (DE)

( * ) Notice: Subject to any disclaimer, the term of this patent is extended or adjusted under 35 U.S.C. 154(b) by 260 days.

(21) Appl. No.: 18/067,091

(22) Filed: Dec. 16, 2022

(65) Prior Publication Data
US 2024/0204888 A1 Jun. 20, 2024

(51) Int. Cl.
H04B 17/00 (2015.01)

(52) U.S. Cl.
CPC ................................ *H04B 17/0085* (2013.01)

(58) Field of Classification Search
CPC ...... H04B 17/0085; G01R 31/00; G01R 1/28; G01R 31/2822
USPC ........................................ 455/67.14; 375/224
See application file for complete search history.

(56) References Cited

U.S. PATENT DOCUMENTS

| | | | | |
|---|---|---|---|---|
| 7,723,999 B2* | 5/2010 | Strid | .................... | G01R 35/007 324/750.02 |
| 11,353,536 B2 | 6/2022 | Anderson et al. | | |
| 2007/0276614 A1* | 11/2007 | Tan | ........................ | G01R 35/00 702/55 |
| 2008/0052028 A1* | 2/2008 | Pickerd | .............. | G01R 31/3191 702/108 |
| 2020/0166553 A1* | 5/2020 | Bloss | ................. | G01R 31/2822 |
| 2023/0013607 A1* | 1/2023 | Lloyd | ................ | G01R 31/2822 |

* cited by examiner

*Primary Examiner* — Don N Vo
(74) *Attorney, Agent, or Firm* — Studebaker Brackett PLLC (57) ABSTRACT

A radio frequency testing apparatus with voltage standing wave ratio adjustment for testing a device under test is provided. Said radio frequency testing apparatus comprises an input, an output, a signal source for providing a test signal for the device under test via the output, thereby forming an output signal path, a signal sink for receiving a received signal from the device under test via the input, thereby forming an input signal path, and a tracking generator. In this context, the tracking generator and/or the signal sink is configured to determine a corresponding voltage standing wave ratio at the input and/or at the output. Furthermore, the signal source is configured to pre-equalize the test signal on the basis of the corresponding voltage standing wave ratio at the output and/or the input. In addition to this or as an alternative, the signal sink is configured to post-correct the received signal on the basis of the corresponding voltage standing wave ratio at the input and/or the output.

20 Claims, 4 Drawing Sheets

RADIO FREQUENCY TESTING APPARATUS WITH VOLTAGE STANDING WAVE RATIO ADJUSTMENT AND CORRESPONDING METHOD

TECHNICAL FIELD

The disclosure relates to a radio frequency testing apparatus and a corresponding radio frequency testing method. In particular, the disclosure relates to a radio frequency testing apparatus with voltage standing wave ratio adjustment for testing a device under test and a radio frequency testing method with voltage standing wave ratio adjustment for testing a device under test.

BACKGROUND ART

Generally, in times of an increasing number of applications employing radio frequency circuitry, there is a growing need of a radio frequency testing apparatus with voltage standing wave ratio adjustment and a radio frequency testing method with voltage standing wave ratio adjustment each for testing a device under test comprising such an application for verifying correct functioning of said applications in a highly accurate and efficient manner, wherein all systematic error can be compensated for.

Nevertheless, such a radio frequency testing apparatus with voltage standing wave ratio adjustment for testing a device under test and such a radio frequency testing method with voltage standing wave ratio adjustment for testing a device under test are not known.

SUMMARY

Thus, there is a need to provide a radio frequency testing apparatus with voltage standing wave ratio adjustment for testing a device under test and a radio frequency testing method with voltage standing wave ratio adjustment for testing a device under test, wherein not only testing is highly accurate and efficient but also all systematic errors, exemplarily including at those from the signal path within the testing apparatus, the cabling, connections and analog components between the testing apparatus and DUT, can be compensated for.

This is achieved by the embodiments provided in the enclosed independent claims. Advantageous implementations of the present disclosure are further defined in the dependent claims.

According to a first aspect of the invention, a radio frequency testing apparatus with voltage standing wave ratio adjustment for testing a device under test is provided. Said radio frequency testing apparatus comprises an input, an output, a signal source for providing a test signal for the device under test via the output, thereby forming an output signal path, a signal sink for receiving a received signal from the device under test via the input, thereby forming an input signal path, and a tracking generator. In this context, the tracking generator and/or the signal sink is configured to determine a corresponding voltage standing wave ratio at the input and/or at the output. Furthermore, the signal source is configured to pre-equalize the test signal on the basis of the corresponding voltage standing wave ratio at the output and/or the input. In addition to this or as an alternative, the signal sink is configured to post-correct the received signal on the basis of the corresponding voltage standing wave ratio at the input and/or the output. Advantageously, not only testing is highly accurate and efficient but also all systematic error can be compensated for.

With respect to the tracking generator and the signal sink, it is noted that it might be particularly advantageous if the tracking generator and the signal sink are configured to be switchable to the input and the output.

It is further noted that especially in the case of a corresponding behavior being substantially linear or linear, preferably instead of said pre-equalization, a full correction can be performed on just one corresponding side. In this context, it might be particularly advantageous if said full correction is performed just on the corresponding receiver side, especially as it could be purely digital.

With respect to the voltage standing wave ratio, it is noted that said voltage standing wave ratio may especially be understood as the ratio between the corresponding reflected and incident wave, preferably versus frequency.

With respect to the input and the output, it is noted that said input and output can especially be a combined input-output.

According to a first preferred implementation form of the first aspect of the invention, the signal source is configured to pre-equalize the test signal such that mismatch errors, especially systematic mismatch errors, introduced by the output signal path are corrected preferably with respect to a reference plain. Advantageously, for instance, a differentiation concerning the corresponding source of errors has not to take place, thereby increasing efficiency.

According to a second preferred implementation form of the first aspect of the invention, the reference plain is directly at the device under test, especially at an input of the device under test. Advantageously, for example, testing can be performed in an unbiased manner, which leads to an increased accuracy.

According to a further preferred implementation form of the first aspect of the invention, the signal sink is configured to post-correct the received signal such that mismatch errors, especially systematic mismatch errors, introduced by the input signal path are corrected preferably with respect to a reference plain. Advantageously, for instance, a differentiation concerning the corresponding source of errors has not to take place, thereby reducing inefficiencies.

According to a further preferred implementation form of the first aspect of the invention, the reference plain is directly at the device under test, especially at an output of the device under test. Advantageously, for example, testing can be performed in an unbiased manner, which leads to an improved testing especially in the sense of accuracy.

According to a further preferred implementation form of the first aspect of the invention, the radio frequency testing apparatus further comprises at least one further input, and at least one directional device for coupling said at least one further input to the signal sink preferably in addition to the input. Advantageously, for instance, a multi-port device under test can be tested in a particular efficient manner.

With respect to said directional device, it is noted that the directional device may especially be any device that allows the separation of an incident and reflected wave. It might be particularly advantageous if said directional device comprises at least one a directional coupler, a measurement bridge, a resistive bridge, or any combination thereof.

According to a further preferred implementation form of the first aspect of the invention, the tracking generator and/or the signal sink is configured to determine a respective voltage standing wave ratio at the input and the at least one further input preferably in a sequential manner. Advantageously, for example, costs can be reduced, thereby increasing efficiency.

According to a further preferred implementation form of the first aspect of the invention, the radio frequency testing apparatus further comprises at least one further output, and at least one directional device for coupling said at least one further output to the signal source preferably in addition to the output. Advantageously, for instance, a multi-port device under test can be tested in a particular efficient manner.

With respect to said directional device, it is noted that the directional device may especially be any device that allows the separation of an incident and reflected wave. It might be particularly advantageous if said directional device comprises at least one a directional coupler, a measurement bridge, a resistive bridge, or any combination thereof.

With respect to said at least one further output and the above-mentioned at least further input, it is noted that said at least one further input and at least one further output can especially be at least one further combined input-output.

According to a further preferred implementation form of the first aspect of the invention, the tracking generator is configured to determine a respective voltage standing wave ratio at the output and the at least one further output preferably in a sequential manner. Advantageously, for example, costs can be reduced, which leads to an increased efficiency.

According to a further preferred implementation form of the first aspect of the invention, the signal sink comprises the tracking generator. In addition to this or as an alternative, the tracking generator is integrated into the signal sink. Advantageously, for instance, production costs can be reduced.

With respect to said integration of the tracking generator into the signal sink, it is noted that a corresponding housing may be provided.

According to a further preferred implementation form of the first aspect of the invention, the signal sink comprises the signal source. In addition to this or as an alternative, the signal source is integrated into the signal sink. Advantageously, for example, this allows for reducing production costs.

According to a further preferred implementation form of the first aspect of the invention, especially for determining the corresponding voltage standing wave ratio at the input and/or at the output, the tracking generator uses a swept signal and/or a wideband modulated signal. Advantageously, for instance, not only accuracy but also efficiency can further be increased.

It is noted that in addition to or as an alternative of the swept signal and/or the wideband modulated signal, a multi-tone signal can be used.

According to a further preferred implementation form of the first aspect of the invention, the swept signal comprises or is a narrow band signal. Advantageously, for example, inefficiencies can further be reduced.

According to a further preferred implementation form of the first aspect of the invention, the swept signal comprises or is a signal being not stepped. Advantageously, for instance, an increased efficiency can be achieved.

According to a further preferred implementation form of the first aspect of the invention, the test signal comprises or is a modulated signal, preferably a wideband modulated signal. Advantageously, for example, an increased accuracy can be achieved.

According to a further preferred implementation form of the first aspect of the invention, the radio frequency testing apparatus is used for and/or in the context of error vector magnitude determination. Advantageously, for instance, an error vector magnitude can be determined in an unbiased and improved manner.

Before the second aspect of the invention is described in the following, it is noted that all the explanations and advantages mentioned above regarding the first aspect of the invention or any of its preferred implementation forms, respectively, analogously apply for the second aspect of the invention or any of the preferred implementation forms thereof, respectively.

According to a second aspect of the invention, a radio frequency testing method with voltage standing wave ratio adjustment for testing a device under test is provided. Said radio frequency testing method comprises the steps of providing a test signal for the device under test with the aid of a signal source via an output, receiving a received signal from the device under test with the aid of a signal sink via an input, and determining a corresponding voltage standing wave ratio at the input and/or at the output with the aid of a tracking generator and/or the signal sink. Furthermore, said method comprises the step or steps, respectively, of pre-equalizing the test signal on the basis of the corresponding voltage standing wave ratio at the output and/or the input with the aid of the signal source, and/or post-correcting the received signal on the basis of the corresponding voltage standing wave ratio at the input and/or the output with the aid of the signal sink. Advantageously, not only testing is highly accurate and efficient but also all systematic error can be compensated for.

With respect to the above-mentioned elements employed within the scope of the radio frequency testing method, it is noted that said elements may especially be the respective elements of the radio frequency testing apparatus according to the first aspect of the invention or any of its preferred implementation forms, respectively.

With respect to the voltage standing wave ratio, it is noted that said voltage standing wave ratio may especially be understood as the ratio between the corresponding reflected and incident wave, preferably versus frequency.

With respect to the input and the output, it is noted that said input and output can especially be a combined input-output.

According to a first preferred implementation form of the second aspect of the invention, the radio frequency testing method further comprises the step of, especially for determining the corresponding voltage standing wave ratio at the input and/or at the output with the aid of the tracking generator, using a swept signal and/or a wideband modulated signal. Advantageously, for instance, not only accuracy but also efficiency can further be increased.

It is noted that in addition to or as an alternative of the swept signal and/or the wideband modulated signal, a multi-tone signal can be used.

According to a second preferred implementation form of the second aspect of the invention, the swept signal comprises or is a narrow band signal. Advantageously, for example, inefficiencies can further be reduced.

According to a further preferred implementation form of the second aspect of the invention, the swept signal comprises or is a signal being not stepped. Advantageously, for instance, an increased efficiency can be achieved.

BRIEF DESCRIPTION OF THE DRAWINGS

The above-described aspects and implementation forms of the present disclosure will be explained in the following description of specific embodiments in relation to the enclosed drawings, in which.

DETAILED DESCRIPTIONS OF EMBODIMENTS

Figure 1:
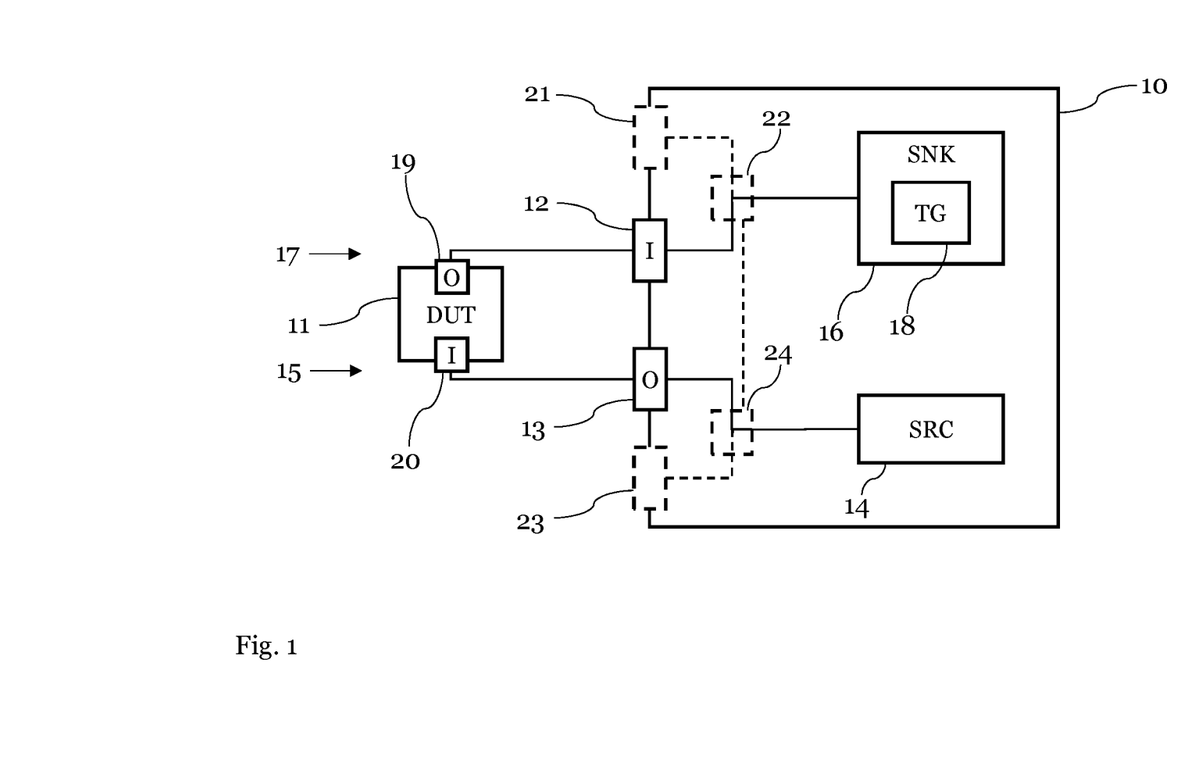
FIG. 1 shows a first exemplary embodiment of the first aspect of the invention.

With respect to FIG. 1, an exemplary embodiment of the inventive radio frequency testing apparatus 10 with voltage standing wave ratio adjustment for testing a device under test 11 is depicted.

In accordance with said FIG. 1, said radio frequency testing apparatus 10 comprises an input 12, an output 13, a signal source 14 for providing a test signal for the device under test 11 via the output 13, thereby forming an output signal path 15, a signal sink 16 for receiving a received signal from the device under test 11 via the input 12, thereby forming an input signal path 17, and a tracking generator 18.

In this context, the tracking generator 18 and/or the signal sink 16 is configured to determine a corresponding voltage standing wave ratio at the input 12 and/or at the output 13. Furthermore, the signal source 14 is configured to pre-equalize the test signal on the basis of the corresponding voltage standing wave ratio at the output 13 and/or the input 12. In addition to this or as an alternative, the signal sink 16 is configured to post-correct the received signal on the basis of the corresponding voltage standing wave ratio at the input 12 and/or the output 13.

It is noted that the above-mentioned input 12 may comprise or be an input port being especially connectable or connected to an output 19, preferably an output port, of the device under test 11. Additionally or alternatively, the above-mentioned output 13 may comprise or be an output port being especially connectable or connected to an input 20, preferably an input port, of the device under test 11. Further additionally or further alternatively, the input 12 may be connectable or connected to the signal sink 16 and/or the output 13 may be connectable or connected to the signal source 14. In further addition to this or as a further alternative, the input 12 may be connectable or connected to the signal source 14 and/or the output 13 may be connectable or connected to the signal sink 16.

It is further noted that it might be particularly advantageous if the signal source is configured to pre-equalize the test signal such that mismatch errors, especially systematic mismatch errors, introduced by the output signal path 15, especially by all fractions thereof, are corrected preferably with respect to a reference plain, exemplarily a first reference plain.

In this context, further advantageously, the reference plain, exemplarily the first reference plain, can directly be at the device under test 11, especially at the input 20 of the device under test 11.

Furthermore, the signal sink 16 may be configured to post-correct the received signal such that mismatch errors, especially systematic mismatch errors, introduced by the input signal path 17, especially by all fractions thereof, are corrected preferably with respect to a reference plain, exemplarily a second reference plain.

In this context, the reference plain, exemplarily the second reference plain, can directly be at the device under test 11, especially the output 19 of the device under test 11.

As it can further be seen from FIG. 1, the radio frequency testing apparatus 10 may comprise at least one further input, exemplarily the further input 21, and at least one directional device, exemplarily the first directional device 22, for coupling said at least one further input, exemplarily the further input 21, to the signal sink 16 preferably in addition to the input 12.

It is noted that all the explanations above regarding the input 12 of the radio frequency testing apparatus 10 may analogously apply for the at least one further input, exemplarily the further input 21. The corresponding remaining elements interacting with the at least one further input, exemplarily the further input 21, especially the signal sink 16 and the tracking generator 18, of the radio frequency testing apparatus 10 may be configured accordingly.

It is further noted that it might be particularly advantageous if the tracking generator 18 and/or the signal sink 16 is configured to determine a respective voltage standing wave ratio at the input 12 and the at least one further input, exemplarily the further input 21, preferably in a sequential manner.

As it can further be seen from FIG. 1, the radio frequency testing apparatus 10 may comprise at least one further output, exemplarily the further output 23, and at least one directional device, exemplarily the second directional device 24, for coupling said at least one further output, exemplarily said further output 23, to the signal source 14 preferably in addition to the output 13.

With respect to said second directional device 24 and the above-mentioned first directional device 22, it is noted that it might be particularly advantageous if the first directional device 22 and the second directional device 24 are connectable or connected especially for signal routing regarding at least the input 12 and the output 13 or regarding the input 12, the further input 21, the output 13, and the further output 23. Advantageously, the signal sink 16 and/or the tracking generator 18 can be connectable or connected to at least the input 12 and the output 13 or the input 12, the further input 21, the output 13, and the further output 23. Further advantageously, the signal source 14 can be connectable or connected to at least the input 12 and the output 13 or the input 12, the further input 21, the output 13, and the further output 23.

It is further noted that all the explanations above regarding the output 13 of the radio frequency testing apparatus 10 may analogously apply for the at least one further output, exemplarily the further output 23. The corresponding remaining elements interacting with the at least one further output, exemplarily the further output 23, especially the signal source 14, of the radio frequency testing apparatus 10 may be configured accordingly.

It is further noted that it might be particularly advantageous if the tracking generator 18 is configured to determine a respective voltage standing wave ratio at the output 13 and the at least one further output, exemplarily the further output 23, preferably in a sequential manner.

As exemplarily depicted by FIG. 1, the signal sink 16 comprises the tracking generator 18. In particular, the tracking generator 18 is integrated into the signal sink 16.

It is noted that it might be particularly advantageous if the signal sink 16 comprises the signal source 14. In addition to this or as an alternative, the signal source 14 may advantageously be integrated into the signal sink 16.

It is further noted that it might be particularly advantageous if, especially for determining the corresponding voltage standing wave ratio at the input 12 and/or at the output 13, the tracking generator 18 uses a swept signal.

With respect to said swept signal, it is noted that the swept signal may preferably comprise or be a narrow band signal. In addition to this or as an alternative, said swept signal can comprise or be a signal being not stepped.

With respect to the above-mentioned test signal, it is noted that said test signal can especially comprise or be a modulated signal, preferably a wideband modulated signal.

With special respect to said modulated signal or said wideband modulated signal, respectively, it is noted that said modulated signal or said wideband modulated signal, respectively, can be generated with the aid of the signal source 14. Then, said signal or the test signal, respectively, can be passed to the input 20 of the device under test 11 exemplarily via the directional device 24. Afterwards, the corresponding reflected electromagnetic wave at the input 20 of the device under test 11 can be separated by said directional device 24. Furthermore, said corresponding reflected electromagnetic wave can be passed to the signal sink 16 via said directional device 24 and/or the directional device 22. Preferably, said signal sink 16 and/or the tracking generator 18 may have a defined phase relation with said signal source 14. Moreover, the signal sink 16 and/or the tracking generator 18 may be configured to process a reference signal. Preferably, said reference signal may be associated with said modulated signal or said wideband modulated signal, respectively. Advantageously, a corresponding channel response can be determined especially by taking said reference signal the corresponding voltage standing wave ratio into account, which may preferably be determined by the signal sink 16 and/or the tracking generator 18, wherein said corresponding voltage standing wave ratio exemplarily depends on said corresponding reflected electromagnetic wave.

In addition to this or as an alternative, especially for the case that the first directional device 22 and the second directional device 24 are interconnected with the aid of a switch, it is noted that the test signal, especially the above-mentioned modulated signal or wideband modulated signal, respectively, can be generated by the signal source 14. Preferably, said switch is connected to said signal source 14. Furthermore, especially on the basis of the corresponding configuration of said switch, the signal source 14 is connected with the input 20 of the device under test 11 or the output 19 of said device under test 11 preferably such that, in accordance with a first configuration of said switch, the test signal generated by the signal source 14 is passed to said input 20 of said device under test 11 and, in accordance with a second configuration of said switch, said test signal generated by said signal source 14 is passed to said output 19 of said device under test 11. In this context, it might be particularly advantageous if said switch is configured to enable the above-mentioned signal sink 16 and/or tracking generator 18 to perform corresponding reflection and/or transmission measurements on the basis of the corresponding configuration of said switch. It is further noted that especially in accordance with a third configuration of the switch, the signal source 14 may be connected with the signal sink 16 and/or the tracking generator 18 preferably such that a reference signal path is provided between the signal source 14 and the signal sink 16 or the tracking generator 18, respectively, wherein the switch may preferably be arranged within said reference signal path such that a reference signal, exemplarily the above-mentioned one, is passed to the signal sink 16 or the tracking generator 18, respectively. With respect to the three different configurations of said switch, it is noted that the switch may preferably be configured to be switchable between said three configurations.

It is further noted that it might be particularly advantageous if the radio frequency testing apparatus 10 is used for and/or in the context of error vector magnitude determination.

Figure 2:
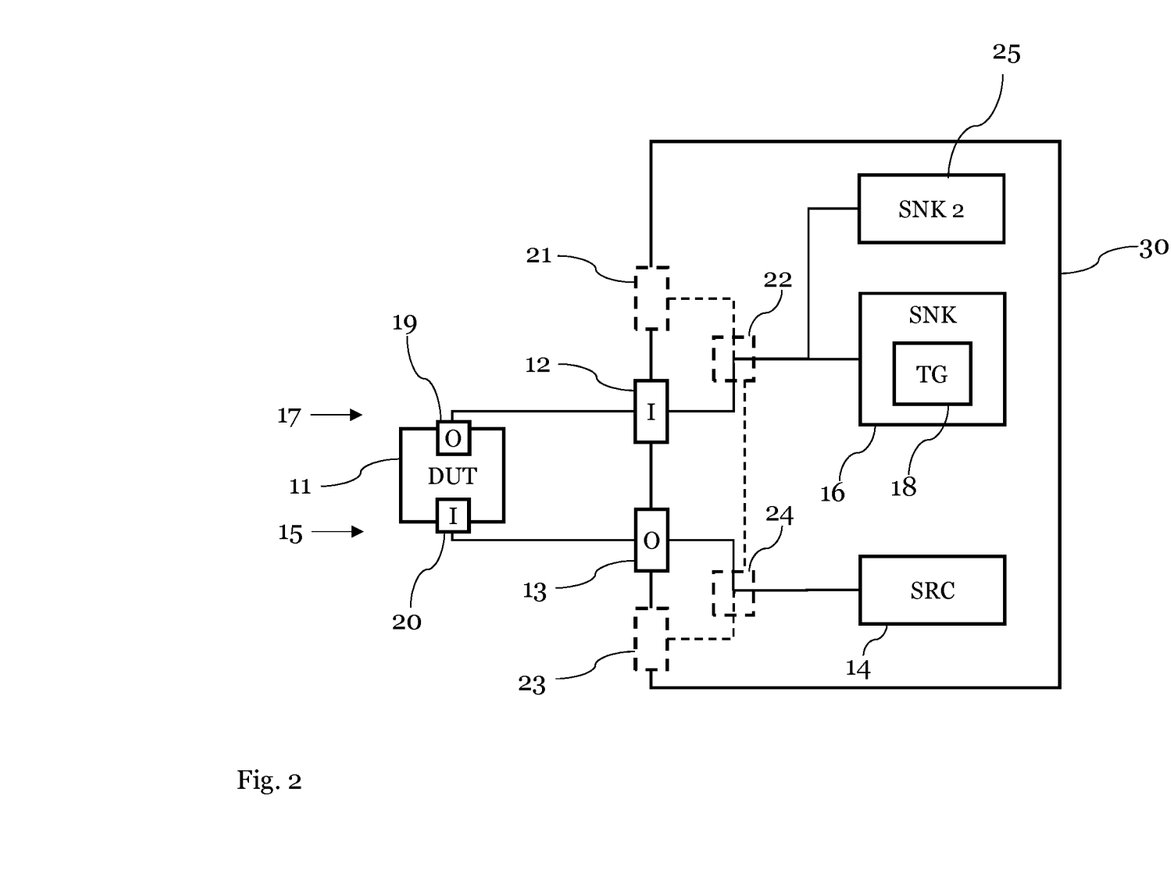
FIG. 2 shows a second exemplary embodiment of the first aspect of the invention.
Figure 3:
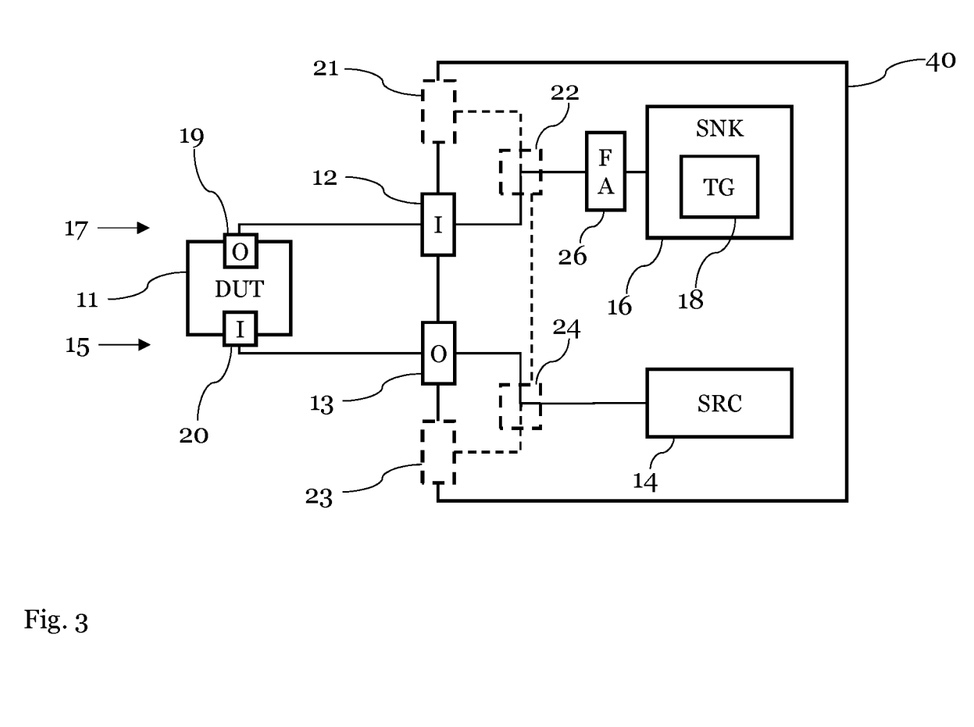
FIG. 3 shows a third exemplary embodiment of the first aspect of the invention.

Now, with respect to FIG. 2 and FIG. 3, it is noted that two further exemplary embodiments of the first aspect of the invention are shown, which are based on the first exemplary embodiment according to FIG. 1. In this context, identical elements are not explained again in the following but are equipped with the same reference signs in FIG. 2 or FIG. 3, respectively, as used in FIG. 1. Accordingly, the corresponding explanations above analogously apply for such elements.

The second exemplary embodiment of the inventive radio frequency testing apparatus 30 according to FIG. 2 differs from FIG. 1 especially in that the testing apparatus 30 additionally comprises further signal sink, exemplarily a second signal sink 25.

In this context, it might be particularly advantageous if said second signal sink 25 is exclusively used for testing the device under test 11, whereas the signal sink 16, which may especially comprise the tracking generator 18, is exclusively used for the voltage standing wave ratio adjustment. As an option, the second signal sink 25 can additionally or alternatively be involved in the voltage standing wave ratio adjustment.

The third exemplary embodiment of the inventive radio frequency testing apparatus 40 according to FIG. 3 differs from FIG. 1 especially in that the testing apparatus 30 additionally comprises a filter arrangement 26. Said filter arrangement 26 is exemplarily arranged within the input signal path. In other words, the input signal path exemplarily comprises the filter arrangement 26. Additionally or alternatively, the output signal path can comprise such a filter arrangement.

With respect to said filter arrangement 26, it is noted that it might be particularly advantageous if the filter arrangement 26 comprises multiple individually activatable filters. In this context, at least two filters of said filter arrangement 26 may be activated. Preferably, said at least two filters may be of a different type. Exemplarily, at least one activated filter may be a lowpass filter and at least one activated filter may be a high-pass filter.

Accordingly, it might be particularly advantageous if the filter arrangement 26 is controlled, especially in accordance with a desired bandwidth regarding the input signal path and/or the output signal path, such that at least one lowpass filter of the filter arrangement 26 and at least one high-pass filter of the filter arrangement 26 are activated.

Again, with respect to the filter arrangement 26, it is noted that it might be particularly advantageous if the filter arrangement 26 comprises at least one mixer. Said at least one mixer may preferably be arranged downstream and/or upstream and/or within the filter arrangement 26. Further, said at least one mixer may preferably be configured to convert the corresponding signal downstream and/or upstream and/or within the filter arrangement 26 to a predefined frequency band, especially a predefined intermediate frequency band.

Figure 4:
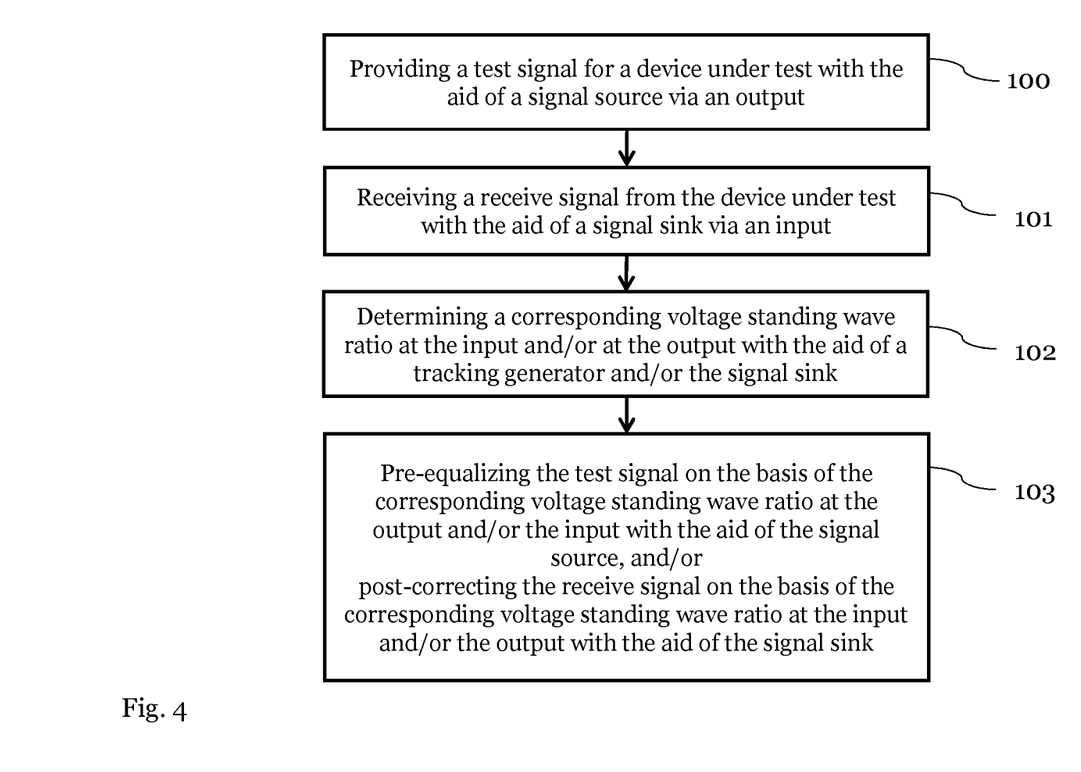
FIG. 4 shows a flow chart of an exemplary embodiment of the second aspect of the invention.

Finally, FIG. 4 illustrates a flow chart of an exemplary embodiment of the inventive radio frequency testing method with voltage standing wave ratio adjustment for testing a device under test. A first step 100 of said radio frequency testing method comprises providing a test signal for the device under test with the aid of a signal source via an output. Furthermore, a second step 101 comprises receiving a received signal from the device under test with the aid of a signal sink via an input. Moreover, a third step 102 comprises determining a corresponding voltage standing wave ratio at the input and/or at the output with the aid of a tracking generator and/or the signal sink. Then, a fourth step 103 of said radio frequency testing method comprises pre-equalizing the test signal on the basis of the corresponding voltage standing wave ratio at the output and/or the input with the aid of the signal source, and/or post-correcting the received signal on the basis of the corresponding voltage standing wave ratio at the input and/or the output with the aid of the signal sink.

While various embodiments of the present invention have been described above, it should be understood that they have been presented by way of example only, and not limitation. Numerous changes to the disclosed embodiments can be made in accordance with the disclosure herein without departing from the spirit or scope of the invention. Thus, the breadth and scope of the present invention should not be limited by any of the above-described embodiments. Rather, the scope of the invention should be defined in accordance with the following claims and their equivalents.

Although the invention has been illustrated and described with respect to one or more implementations, equivalent alterations and modifications will occur to others skilled in the art upon the reading and understanding of this specification and the annexed drawings. In addition, while a particular feature of the invention may have been disclosed with respect to only one of several implementations, such feature may be combined with one or more other features of the other implementations as may be desired and advantageous for any given or particular application.

What is claimed is:

1. A radio frequency testing apparatus with voltage standing wave ratio adjustment for testing a device under test, the radio frequency testing apparatus comprising:
   an input,
   an output,
   a signal source for providing a test signal for the device under test via the output, thereby forming an output signal path,
   a signal sink for receiving a received signal from the device under test via the input, thereby forming an input signal path, and
   a tracking generator,
   wherein the tracking generator and/or the signal sink is configured to determine a corresponding voltage standing wave ratio as a ratio between corresponding reflected and incident waves versus frequency at the input or at the output, and
   wherein the signal source is configured to pre-equalize the test signal on the basis of the corresponding voltage standing wave ratio at the output or the input, and
   wherein the signal sink is configured to post-correct the received signal on the basis of the corresponding voltage standing wave ratio at the input or the output.

2. The radio frequency testing apparatus according to claim 1,
   wherein the signal source is configured to pre-equalize the test signal such that mismatch errors, especially systematic mismatch errors, introduced by the output signal path are corrected with respect to a reference plain.

3. The radio frequency testing apparatus according to claim 2,
   wherein the reference plain is directly at the device under test, especially at an input of the device under test.

4. The radio frequency testing apparatus according to claim 1, wherein the signal sink is configured to post-correct the received signal such that mismatch errors, especially systematic mismatch errors, introduced by the input signal path are corrected with respect to a reference plain.

5. The radio frequency testing apparatus according to claim 4, wherein the reference plain is directly at the device under test, especially at an output of the device under test.

6. The radio frequency testing apparatus according to claim 1, wherein the radio frequency testing apparatus further comprises:
   at least one further input, and
   at least one directional device for coupling said at least one further input to the signal sink in addition to the input.

7. The radio frequency testing apparatus according to claim 6,
   wherein the tracking generator and/or the signal sink is configured to determine a respective voltage standing wave ratio at the input and the at least one further input in a sequential manner.

8. The radio frequency testing apparatus according to claim 1, wherein the radio frequency testing apparatus further comprises:
   at least one further output, and
   at least one directional device for coupling said at least one further output to the signal source in addition to the output.

9. The radio frequency testing apparatus according to claim 8,
   wherein the tracking generator is configured to determine a respective voltage standing wave ratio at the output and the at least one further output in a sequential manner.

10. The radio frequency testing apparatus according to claim 1,
    wherein the signal sink comprises the tracking generator, and/or
    wherein the tracking generator is integrated into the signal sink.

11. The radio frequency testing apparatus according to claim 1,
    wherein the signal sink comprises the signal source, and/or
    wherein the signal source is integrated into the signal sink.

12. The radio frequency testing apparatus according to claim 1,
    wherein, especially for determining the corresponding voltage standing wave ratio at the input and/or at the output, the tracking generator uses a swept signal and/or a wideband modulated signal.

13. The radio frequency testing apparatus according to claim 12,
    wherein the swept signal comprises or is a narrow band signal.

14. The radio frequency testing apparatus according to claim 12,
    wherein the swept signal comprises or is a signal being not stepped.

15. The radio frequency testing apparatus according to claim 1,
    wherein the test signal comprises or is a wideband modulated signal.

16. The radio frequency testing apparatus according to claim 1, wherein the radio frequency testing apparatus is used for and/or in the context of error vector magnitude determination.

17. A radio frequency testing method with voltage standing wave ratio adjustment for testing a device under test, the radio frequency testing method comprising the steps of:

providing a test signal for the device under test with the aid of a signal source via an output, receiving a received signal from the device under test with the aid of a signal sink via an input, determining a corresponding voltage standing wave ratio as a ratio between corresponding reflected and incident waves versus frequency at the input or at the output with the aid of a tracking generator and/or the signal sink, and pre-equalizing the test signal on the basis of the corresponding voltage standing wave ratio at the output or the input with the aid of the signal source, and post-correcting the received signal on the basis of the corresponding voltage standing wave ratio at the input or the output with the aid of the signal sink.

18. The radio frequency testing method according to claim 17, wherein the radio frequency testing method further comprises the step of, especially for determining the corresponding voltage standing wave ratio at the input and/or at the output with the aid of the tracking generator, using a swept signal and/or a wideband modulated signal.

19. The radio frequency testing method according to claim 18, wherein the swept signal comprises or is a narrow band signal.

20. The radio frequency testing method according to claim 18, wherein the swept signal comprises or is a signal being not stepped.

\* \* \* \* \*